Figure 1:
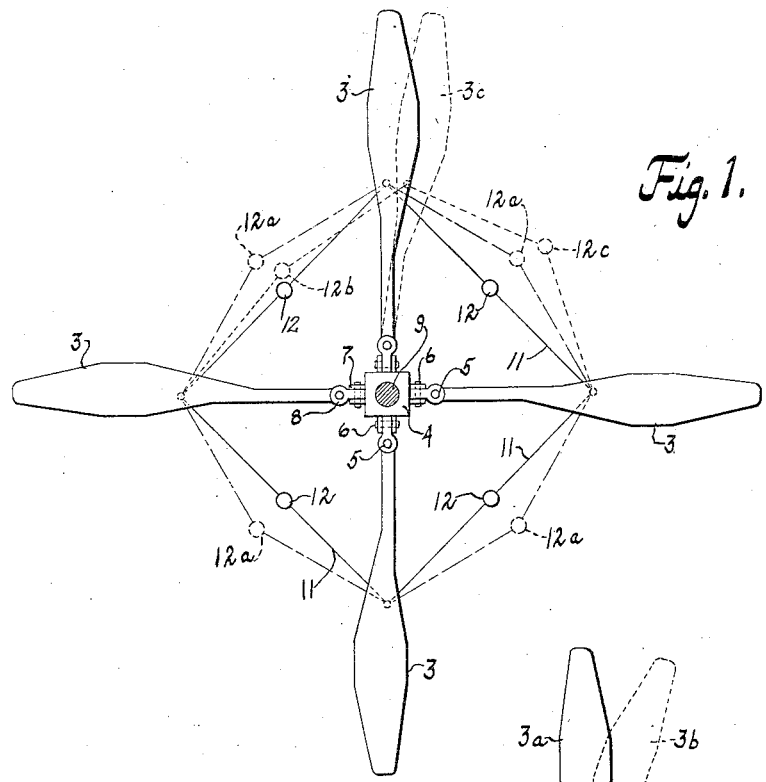

Oct. 25, 1932.       J. DE LA CIERVA       1,884,597

SUSTAINING ROTOR CONSTRUCTION FOR AIRCRAFT

Original Filed Nov. 1, 1926

INVENTOR.
Juan de la Cierva
BY
Symnestvedt + Lechner
ATTORNEYS.

Patented Oct. 25, 1932

1,884,597

UNITED STATES PATENT OFFICE

JUAN DE LA CIERVA, OF MADRID, SPAIN, ASSIGNOR TO AUTOGIRO COMPANY OF AMERICA, OF PHILADELPHIA, PENNSYLVANIA, A CORPORATION OF DELAWARE

SUSTAINING ROTOR CONSTRUCTION FOR AIRCRAFT

Original application filed November 1, 1926, Serial No. 145,655, and in Great Britain November 19, 1925. Divided and this application filed November 26, 1930. Serial No. 498,298.

This invention relates to sustaining rotor construction for aircraft and is particularly concerned with the type of rotor construction in which a plurality of sustaining wings or blades are mounted for rotation about a common axis. Furthermore, it should be noted that the invention is especially useful in connection with rotor constructions of this general type which are arranged in such manner that the rotation of the sustaining blades is caused or effected by means of relative air-flow such as results from movement of the craft through the atmosphere.

The present application is a division of my co-pending application Serial No. 145,655, filed November 1st, 1926, issued May 24, 1932, as Patent No. 1,859,584.

The nature, objects and advantages of the invention can best be understood from a consideration of the following discussion:

In aircraft of this type the sustaining blades, in addition to being arranged for rotation about a common axis, are provided with means which permit individual movement or displacement of the blades independently of the common rotation thereof. Such means may take the form of pivoted or articulated joints or may involve longitudinal flexibility of the blades themselves or blade mounting parts or a combination of such arrangements.

Preferably, the blades are pivoted to a hub member on a plurality of axes, the hub member being mounted for rotation on a bearing or supporting shaft in such manner as to provide for the common rotation of the set of blades or wing system.

At this point it should be noted that the movements of the sustaining blades in their general path of rotation and the forward travel of the aircraft through the air result in individual blade movements on the pivot axes above referred to, such movements being produced, of course, by the effect of centrifugal, lift, drag and anti-drag, and other forces to which the blades are subjected. These movements, of course, vary in direction as well as amplitude at various points in each revolution of the blade system.

It has been found to be desirable to yieldingly resist or restrain at least certain of these individual blade movements in order to obtain the smoothest possible running of the rotor construction as well as maximum efficiency and controllability in flight, as well as in landing and taking off from the ground. To this end the present invention contemplates the use of blade interconnections which are operative under the influence of centrifugal force to yieldingly restrain the movements above referred to.

The nature, as well as other objects and advantages of the invention will be understood still more clearly from a consideration of the appended drawing and the following description of the structure illustrated therein, the same including two embodiments of the invention.

Of the drawing,—

Figure 2:
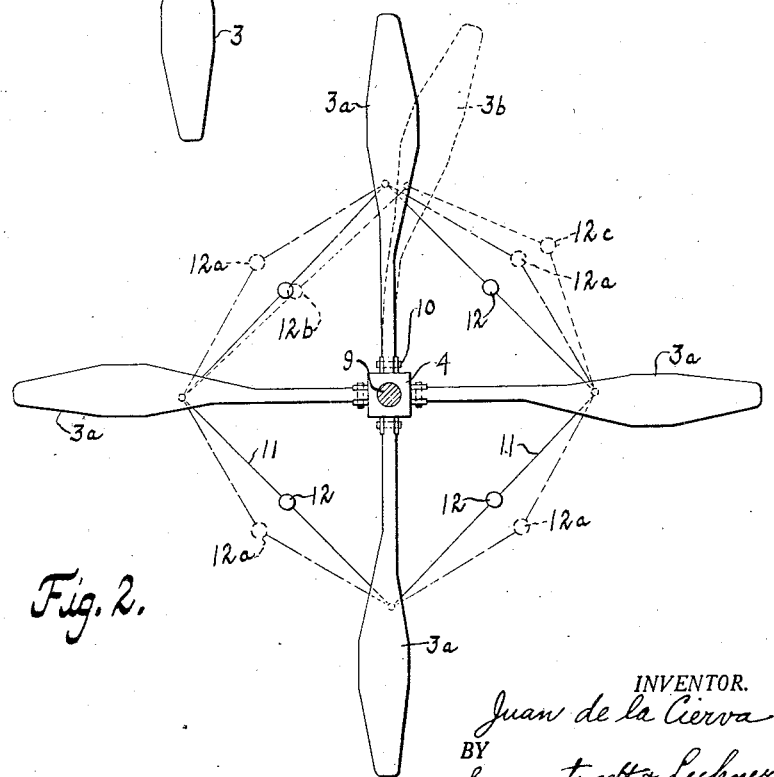

Figure 1 is a somewhat diagrammatic top view of a rotor construction embodying the novel features of the present invention; and Figure 2 is a view similar to Figure 1, illustrating a somewhat modified construction.

Referring first to Figure 1, the individual blades or wings of the sustaining rotor construction are indicated by the reference numeral 3. Each one of the blades 3 is pivoted or articulated to the hub member 4, the articulations, in each instance, including a substantially vertically disposed pivot 5 and a substantially horizontally disposed pivot 6. The pivots 5 and 6, of course, are provided by means of suitable lugs 7 secured to the hub member 4 and joint parts 8, which co-operate with the lugs 7 and the inner ends of the blades 3, to complete the dual articulation.

It will be seen, therefore, that in this embodiment of the invention the blades are free to revolve as a unit about the shaft 9, on which the hub 4 is mounted, and in addition, they are free independently and individually to assume different positions under the influence of various forces such as those mentioned above. For example, the blades may pivot or be displaced out of the normal position as indicated in dotted lines at 3c.

In accordance with Figure 2, the sustaining blades 3a are articulated or pivoted to the hub member 4 only on a substantially horizontally disposed axis 10. In order to provide for individual blade movements or displacements in the general path of travel thereof, the blades 3a are made longitudinally flexible, so that under the influence of drag, anti-drag and other forces they may flex or be displaced out of the normal or radial position, as indicated for example at 3b in Figure 2.

In order to yieldingly resist various individual blade movements, particularly those occurring in the general path of travel of the blades, the present invention makes provision for blade interconnections which take the form of a plurality of cables 11 extending between adjacent blades and with which weight means are associated. In both of the figures, such weight means are indicated by the reference numeral 12, the showing at 12 being such as would appear when the rotor construction is standing idle and, therefore, not acted upon by any of the forces of rotation or flight. It should be noted that the cables 11 are somewhat longer than the distance between the points of attachment thereof to adjacent blades when the latter are in the normal or radial position. Therefore, during rotation of the blade system, the action of centrifugal force on the weight means 12 causes such weights to move outwardly from the center of rotation of the system for example, as indicated at 12a in both of the figures.

Under these circumstances, when various forces tend to cause a blade displacement such as indicated at 3b or 3c in Figures 2 and 1, respectively, the weight on one side of the displaced blade will be drawn inwardly as indicated at 12b, while the weight on the other side will move outwardly to a position such as indicated at 12c. The effect of centrifugal force on the weights and blades in these positions, and with the connecting cables somewhat straightened on one side and increased in relative angular disposition at the other side, results in a tendency to restore the position of equilibrium. In this way the blade connections, including the weight means, constantly and yieldingly tend to maintain the blades in their normal or radial position.

In this connection it should be noted that the expressions "normal position" and "radial position" are used herein to designate the position in which the blades remain when the rotor is at rest, and are not to be understood as indicating that the blades, during normal rotation or flight, do not move forwardly and rearwardly in the general path of travel of the blades as well as upwardly and downwardly with respect thereto.

From the foregoing, it will be seen that the present invention provides a means for yieldingly resisting various of the blade movements or displacements which result from the rotation thereof and the translational movement of the craft through the atmosphere by the use of a simple, convenient and rugged form of apparatus, utilizing centrifugal force as the actuating agent. Smoothness of operation and the like, as well as various other objects and advantages hereinbefore referred to are, therefore, obtained.

I claim:

1. An aircraft rotor construction including a set of sustaining blades, means providing for rotation of the set about a common axis, means providing for displacement of the blades fore and aft in the general path of movement thereof, and means operable by the action of centrifugal force to yieldingly resist said displacement.

2. An aircraft rotor construction including a set of sustaining blades, means providing for rotation of the set about a common axis, means providing for displacement of the blades individually in addition to the common rotation thereof on axes generally transverse the longitudinal axes of the blades, and means operable by the action of centrifugal force to yieldingly resist said displacement, said last means including a ponderable body, movable relatively to a blade.

3. An aircraft rotor construction including a set of sustaining blades, means providing for rotation of the set about a common axis, means providing for displacement of the blades individually in addition to the common rotation thereof, and means operable by the action of centrifugal force to yieldingly resist said displacement, the last mentioned means including connections between blades and weight means associated therewith.

4. A sustaining rotor construction for aerial devices, including a set of sustaining blades, means providing for rotation of the set about a common axis, means permitting displacement of a blade independently of another blade, in addition to its rotative movement, and a device operable under the influence of centrifugal, substantially independently of air reaction, force to resist said displacement.

5. An aircraft rotor construction including a set of sustaining blades actuable by relative air-flow, means providing for rotation of the set about a common axis, means providing for displacement of the blades individually in addition to the common rotation thereof, and means operable by the action of centrifugal force, substantially independently of air reaction, to yieldingly resist said displacement.

6. An aircraft rotor construction including a set of sustaining blades, means providing for rotation of the set about a common axis, means providing for displacement of the blades fore and aft in the general path of movement thereof, and means operable by the action of centrifugal force to yieldingly resist said displacement, the last mentioned means including cables interconnecting the blades and weight means associated with said cables.

7. An aircraft rotor construction including a set of sustaining blades; a mounting structure therefor having means providing for rotation of the set of blades about a common axis, and means providing for displacement of the blades independently of the common rotation thereof, the blades being restrained as against bodily change in pitch setting; and a mechanism operable by the action of centrifugal force to yieldingly resist displacement of the blades.

8. An aircraft rotor construction including a set of sustaining blades; a mounting structure therefor having means providing for rotation of the set of blades about a common axis, and means providing for displacement of the blades independently of the common rotation thereof; and a mechanism for yieldingly resisting the displacement of the blades including blade interconnections having weight means associated therewith.

9. An aircraft rotor construction including a set of sustaining blades; a mounting structure therefor having means providing for rotation of the set of blades about a common axis, and means providing for displacement of the blades independently of the common rotation thereof; and a mechanism for yieldingly resisting the displacement of the blades including blade interconnections between adjacent blades having weight means associated therewith.

10. An aircraft rotor construction including a set of sustaining blades; a mounting structure therefor having means providing for rotation of the set of blades about a common axis, and means providing for displacement of the blades independently of the common rotation thereof on substantially vertically disposed axes; and means operable by the action of centrifugal force to yieldingly resist such displacement.

11. An aircraft rotor construction including a set of sustaining blades; a mounting structure therefor having means providing for rotation of the set of blades about a common axis, and means providing for displacement of the blades independently of the common rotation thereof on substantially vertically disposed axes; and means operable by the action of centrifugal force to yieldingly resist such displacement, the last mentioned means including blade interconnections having weight means associated therewith.

12. An aircraft rotor construction including a set of sustaining blades actuable by relative air-flow; a mounting structure therefor having means providing for rotation of the set of blades about a common axis, and means providing for displacement of the blades independently of the common rotation thereof on substantially vertically disposed axes; and means operable by the action of centrifugal force to yieldingly resist such displacement.

13. An aircraft rotor construction including a set of sustaining blades actuable by relative air-flow; a mounting structure therefor having means providing for rotation of the set of blades about a common axis, and means providing for displacement of the blades independently of the common rotation thereof, the blades being restrained as against bodily change in pitch setting; and a mechanism operable by the action of centrifugal force to yieldingly resist displacement of the blades.

14. An aircraft rotor construction including a set of sustaining blades; a mounting structure therefor having means providing for rotation of the set of blades about a common axis, and means providing for displacement of the blades independently of the common rotation thereof on a plurality of axes; and means operable by the action of centrifugal force to yieldingly resist displacement.

15. An aircraft rotor construction including a set of sustaining blades; a mounting structure therefor having means providing for rotation of the set of blades about a common axis, and means providing for displacement of the blades independently of the common rotation thereof on substantially horizontally and substantially vertically disposed axes; and means operable by the action of centrifugal force to yieldingly resist displacement.

16. An aircraft rotor construction including a set of longitudinally flexible sustaining blades, means providing for rotation of the set about a common axis, and a device operable by the action of centrifugal force to yieldingly resist longitudinal flexure of the blades.

17. An aircraft rotor construction including sustaining blades or wings which are longitudinally flexible in a direction comprised within the general path of travel thereof to provide for fore and aft displacement movements of the blades or wings within the said path of travel, means providing for rotation of the several blades or wings about a common axis, and a device operable by the action of centrifugal force to yieldingly resist longitudinal flexure of the blades or wings.

In testimony whereof I have hereunto signed my name.

JUAN DE LA CIERVA.

CERTIFICATE OF CORRECTION.

Patent No. 1,884,597.  October 25, 1932.

JUAN DE LA CIERVA.

It is hereby certified that error appears in the printed specification of the above numbered patent requiring correction as follows: Page 2, line 108, claim 4, after "centrifugal" insert the word "force", and in line 109, strike out the word "force"; and that the said Letters Patent should be read with these corrections therein that the same may conform to the record of the case in the Patent Office.

Signed and sealed this 27th day of December A. D. 1932.

(Seal)

M. J. Moore,
Acting Commissioner of Patents.